(12) United States Patent
Shimotoyodome

(10) Patent No.: US 6,442,852 B1
(45) Date of Patent: Sep. 3, 2002

(54) SCRIBE DEVICE

(75) Inventor: Gyo Shimotoyodome, Tokyo (JP)

(73) Assignees: Beldex Corporation (JP); THK Co., Ltd. (JP)

( * ) Notice: Subject to any disclaimer, the term of this patent is extended or adjusted under 35 U.S.C. 154(b) by 0 days.

(21) Appl. No.: 09/623,147

(22) PCT Filed: Dec. 28, 1999

(86) PCT No.: PCT/JP99/07365

§ 371 (c)(1),
(2), (4) Date: Aug. 28, 2000

(87) PCT Pub. No.: WO00/41862

PCT Pub. Date: Jul. 20, 2000

(30) Foreign Application Priority Data

Jan. 11, 1999 (JP) .......................... 11-003840

(51) Int. Cl.[7] ............................... B43L 13/00
(52) U.S. Cl. ........................ 33/32.1; 33/18.1; 33/32.3; 33/26; 33/666
(58) Field of Search .................. 33/18.1, 32.1, 33/32.3, 26, 27.01, 666, DIG. 2

(56) References Cited

U.S. PATENT DOCUMENTS

| 277,601 A | 5/1883 | Olmstead |
| 3,122,953 A | 3/1964 | Atkeson ........................ 83/7 |
| 3,353,273 A | 11/1967 | Sicking et al. ................ 33/18 |
| 3,564,712 A | 2/1971 | Davis ........................ 30/164.9 |
| 3,577,636 A | 5/1971 | Detorre .................... 30/164.95 |
| 3,681,627 A | 8/1972 | Murray et al. ............... 173/117 |
| 3,880,028 A | 4/1975 | Frederick, Jr. ................... 83/7 |
| 3,995,135 A | 11/1976 | Osipov et al. ................ 219/88 |
| 4,220,066 A | 9/1980 | Hargreaves et al. .......... 83/886 |
| 4,558,622 A | 12/1985 | Tausheck ..................... 83/885 |
| 4,807,979 A | * 2/1989 | Saccomanno et al. ........ 33/666 |
| 4,825,555 A | * 5/1989 | Murayama et al. ........... 33/666 |
| 5,042,155 A | * 8/1991 | Yoshioka et al. ............ 33/18.1 |
| 5,394,174 A | * 2/1995 | Nguyen ...................... 33/18.1 |
| 5,512,808 A | 4/1996 | Clark, Jr. et al. ........... 318/575 |
| 5,594,991 A | * 1/1997 | Therond ..................... 33/18.1 |
| 6,021,574 A | 2/2000 | Murray, III .................. 33/18.1 |

FOREIGN PATENT DOCUMENTS

| EP | 0 905 097 A1 | 3/1999 |
| JP | 1-110234 | 7/1989 |
| JP | 3-264300 | 11/1991 |
| JP | 4-224899 | 8/1992 |
| JP | 8-2000 | 1/1996 |
| JP | 09-025134 | 1/1997 |
| JP | 09-278473 | 10/1997 |
| JP | 11-003840 | 1/1999 |
| JP | 11-015309 | 1/1999 |
| JP | 11-157860 | 6/1999 |

* cited by examiner

Primary Examiner—Diego Gutierrez
Assistant Examiner—Yaritza Guadalupe
(74) Attorney, Agent, or Firm—Eugene Stephens & Associates

(57) ABSTRACT

A body (10) movably supports a holder (20) for movement in a vertical direction. A piezo actuator (40) is sandwiched between the body (10) and the holder (20). Vertical vibrations of the piezo actuator (40) are transmitted to a cutter (30) attached to a lower end portion of the holder (20), so that a scribe line is formed on a workpiece (100). The holder (20) is supported by a resilient member and a slide support portion (60) with the piezo actuator (40) placed therebetween. The resilient member includes a plate spring (61) and a ball (62) made of resilient material. The resilient member resiliently supports the holder (20) in the vibrating directions.

4 Claims, 5 Drawing Sheets

SCRIBE DEVICE

TECHNICAL FIELD

This invention relates to a scribe device for forming a scribe line on a surface of a workpiece of brittle material such as a plate glass, ceramics or the like.

BACKGROUND ART

In general, in order to break a plate-like workpiece of brittle material, a scribe line is preliminarily formed on a surface of the workpiece so that the workpiece can be broken along this scribe line. A conventional scribe device is disclosed, for example, in Japanese Utility Model Non-examined Publication (Kokai) No. H01-110234. This conventional scribe device includes a disc-like cutter which is sharpened at its peripheral edge, a holder for rotatably supporting the cutter and a pressing/moving mechanism for pressing the cutter against a surface of a plate glass through the holder and moving the cutter along the surface of the plate glass.

In the device having the above-mentioned construction, a scribe line is formed by moving the cutter in a state of the cutter being pressed against the plate glass. However, the conventional device has the following problems. Although, if the force for pressing the cutter against the plate glass is increased, a deep scribe line is formed and the plate glass can be broken easily, a horizontal crack extending leftward and rightward from this scribe line occurs, thus resulting in generation of chips, peel-off and the like in the nearby area of the scribe line. In contrast, if the force for pressing the cutter against the plate glass is decreased, no horizontal crack occurs but a vertical crack is decreased in depth, thus disabling to obtain a favorably breakage of the plate glass.

In view of the above, there is disclosed, in Japanese Patent Non-examined Publication (Kokai) No. H09-25134, a scribe device in which a scribe line is formed on a surface of a workpiece of brittle material by applying a vibration thereto. In this scribe device, an outside barrel of an air cylinder is fixed to a support portion and an inside barrel of the air cylinder is connected to one end of a piezo actuator. The other end of the piezo actuator is connected with a cutter retaining portion. The cutter retaining portion is slidably attached to the support portion through a slider mechanism. The cutter retaining portion is moved up and down in accordance with expansion and contraction of the piezo actuator and a scribe line is formed on a workpiece by vibration caused by the up and down movement of the cutter retaining portion.

In this conventional scribe device, since a side surface of the outside barrel of the air cylinder is fixed to the support portion, a moment is generated. This makes it necessary to employ a slide mechanism in order to transmit a vibration to the workpiece stably.

Examples of a slide mechanism employable in such a scribe device as mentioned above include a slide bearing, a rolling bearing and the like. In general, a rolling bearing is used in view of friction coefficient, etc. The rolling bearing is for supporting a slide motion by causing a rolling body such as a ball and a roller to rotate while supplying a lubricant to the rolling body. Since the vibration of the scribe device reciprocally moves a distance of several microns several hundreds thousand times in one minute, oil shortage occurs. As a consequence, a phenomenon called flaking occurs due to friction between the rolling body and the slider. This shortens the service life of the slider in the scribe device including the slide mechanism. Therefore, the requirement for a longer service life of the scribe device can not be met.

DISCLOSURE OF INVENTION

In order to solve the above problems, according to a first aspect of the present invention, there is provided a scribe device comprising a body; a holder; a vibration actuator supported between the body and the holder and generating vibrations in opposing directions thereof; an abutment member retained by one end portion of the holder and for transmitting the vibrations, which have been given to the holder from the vibration actuator, to a workpiece; and a support member for movably supporting the holder on the body of movement in the vibrating directions, wherein the support member includes resilient members which are disposed between the vibration actuator and the abutment member and resiliently deformable only in the vibrating directions.

By virtue of the above constitution, since the holder is supported by the resilient members, there is not need of a provision of a slide mechanism comprising a long rolling bearing or the like between the body and the holder. This enhances a long service life of the device. Moreover, since the resilient members are arranged between the vibration actuator and the abutment member, the lateral swinging of the abutment member could be minimized even if the holder should be laterally swung. Therefore, a stable scribing operation can be obtained.

According to a second aspect of the present invention, there is provided a scribe device having further features, in addition to the features of the first aspect of the present invention, in which the resilient members of the support member bias the holder against the actuator, thereby applying a pre-load to the vibration actuator. Since the resilient members apply the pre-load to the vibration actuator, the abutment member can be vibrated in accordance with the vibration of the vibration actuator and without being affected by reaction from the workpiece. Therefore, a favorable scribing operation can be obtained.

According to a third aspect of the present invention, there is provided a scribe device having further features, in addition to the features of the second aspect of the present invention, in which the body is provided, at an abutment portion where the body is abutted with the vibration actuator, with pre-load adjustment means for adjusting a pre-load to be applied to the vibration actuator. By this, a suitable scribing operation for a particular workpiece can be obtained.

According to a fourth aspect of the present invention, there is provided a scribe device having further features, in addition to the features of the third aspect of the present invention, in which the pre-load adjustment means includes an adjustment screw threadingly engaged with the body, the pre-load applied to the vibration actuator being adjusted by adjusting a screwing amount of the adjustment screw. By this, a pre-load adjustment can be made easily by the adjustment screw.

According to a fifth aspect of the present invention, there is provided a scribe device having further features, in addition to the features of the first aspect of the present invention, in which each of the resilient members of the support member includes a plate spring. By this, rotation of the holder can be prohibited.

According to a sixth aspect of the present invention, there is provided a scribe device having further features, in addition to the features of the fifth aspect of the present invention, in which the plate spring are fixed, at opposite ends thereof, to the body and at a center thereof, to the holder, respectively. By this, the holder can be supported stably.

According to a seventh aspect of the present invention, there is provided a scribe device having further features, in addition to the features of the sixth aspect of the present invention, in which a bent portion is formed between the center and each of the opposite ends of the plate spring where the plate spring is fixed to the body and the holder, respectively. By this, the holder can be supported and can move smoothly in the vibrating directions.

According to an eighth aspect of the present invention, there is provided a scribe device having further features, in addition to the features of one of the first to seventh aspects of the present invention, in which the resilient member includes a ball made of resilient material, the ball being pinchingly held by a pair of spherical receiving seats disposed on the body and the holder. By this, the occurrence of a resonance can be avoided. Therefore, a stable scribing operation can be obtained.

According to a ninth aspect of the present invention, there is provided a scribe device having further features, in addition to the features of the first aspect of the present invention, in which the scribe device further comprises a slide support portion, the slide support portion being in opposing relation to the support members in the vibrating directions and arranged, when viewed from the vibration actuator, on the opposite side of the abutment member. By this, the holder can be supported in a more stable manner.

According to a tenth aspect of the present invention, there is provided a scribe device having further features, in addition to the features of the ninth aspect of the present invention, in which the slide support portion comprises a slide holder formed in the holder and having an axis extending along the vibrating directions, and a projection formed on the body in such a manner as to project in the vibrating directions and fitted into the slide hole. By this, the slide support portion can be simplified in structure.

BEST MODE FOR CARRYING OUT THE INVENTION

One embodiment of the present invention will be described hereinafter with reference to the drawings.

Figure 1:
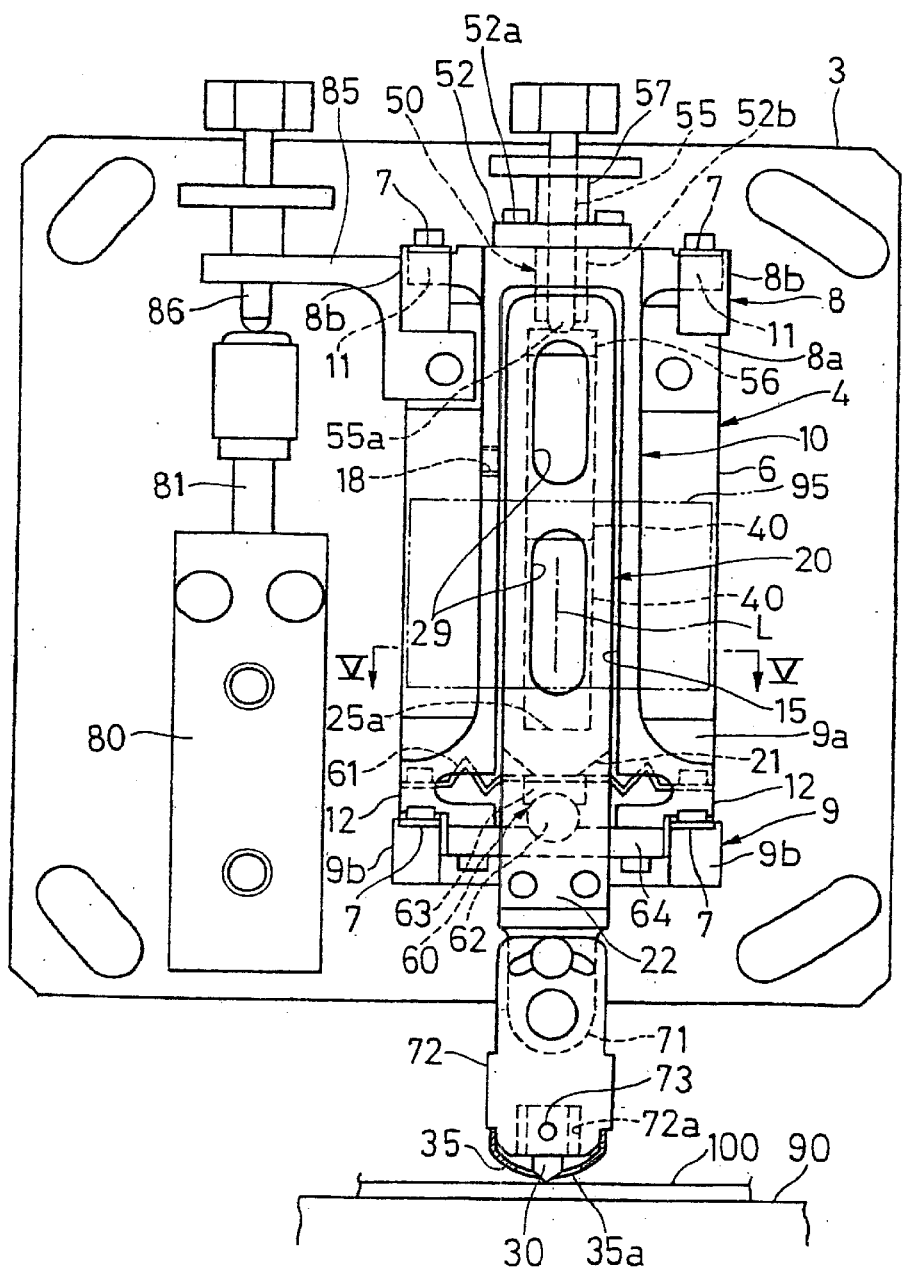
FIG. 1 is a front view of a scribe device according to one embodiment of the present invention.
Figure 2:
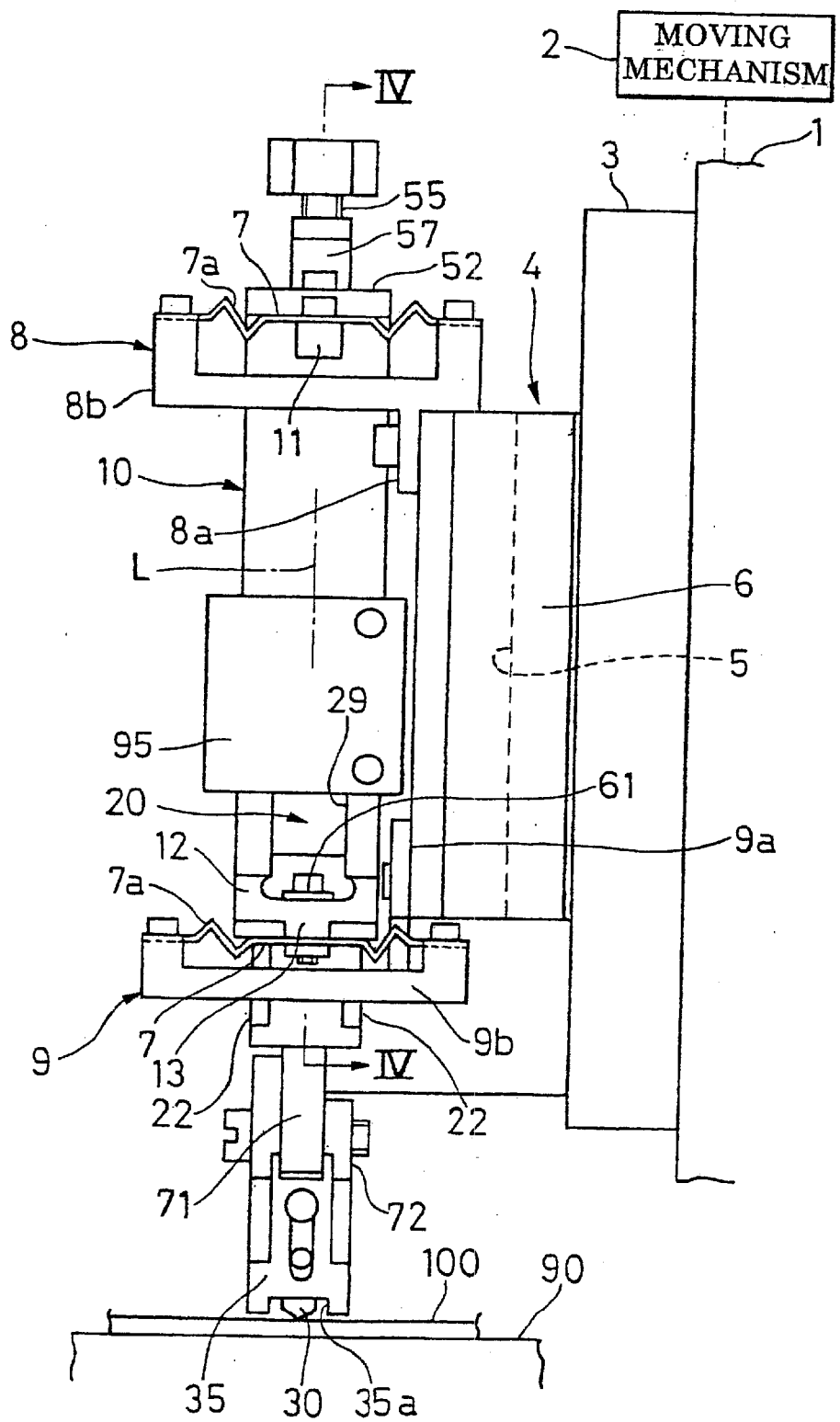
FIG. 2 is a side view thereof.
Figure 3:
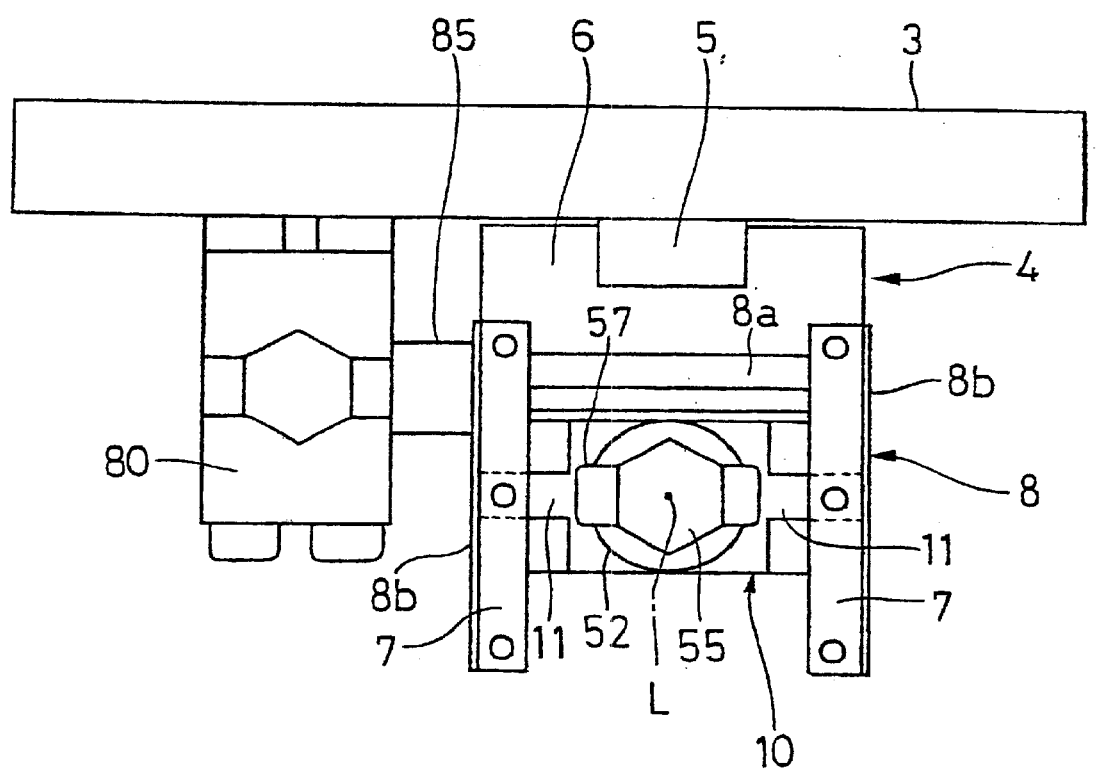
FIG. 3 is a plan view thereof.

As shown in FIGS. 1 to 3, a scribe device comprises a moving base 1 (support table, shown only in FIG. 2), a moving mechanism 2 (shown only in FIG. 2) for moving the moving base 1 in a horizontal direction, a slide mechanism 4 attached to the moving base 1 through a base plate 3, a body 10 movably supported by the slide mechanism 4 for movement in a vertical direction, a holder 20 supported by the body 10 such that the holder 20 can slightly slide in a vertical direction, a cutter 30 (head, abutment member) disposed at a lower end of the holder 20 and two piezo actuators 40 (vibration actuators) for applying a vertical vibration to the holder 20.

The moving mechanism 2 moves the moving base 1 horizontally in a left and right direction in FIG. 1 and in a direction orthogonal to a paper surface in FIG. 2.

The slide mechanism 4 includes a guide 5 fixed to the base plate 3 and a slider 6 slidably supported by the guide 5 for sliding in a vertical direction. The slider 6 is limited its lowermost position by a stopper (not shown) disposed on the guide 5.

The body 10 is supported by slider 6 through four plate springs 7 (vibration damping members having resiliency). This will be described hereinafter in detail.

Figure 6:
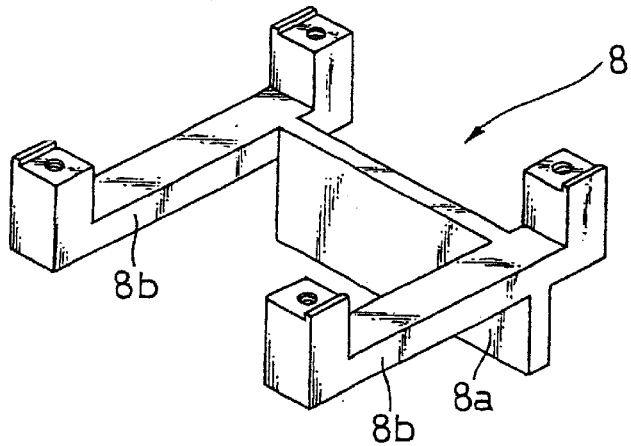
FIG. 6 is a perspective view showing an upper bracket for supporting a damping plate spring.

Brackets 8, 9 are fixed to an upper and a lower end portion of the slider 6, respectively. The upper bracket 8, as shown in FIG. 6, includes a plate-like attachment portion 8a fixed to the slider 6, and U-shaped spring fixing portions 8b disposed at a left and a right side of the attachment portion 8a and extending forward. As best shown in FIG. 2, opposite ends of the plate spring 7 extending in a back and forth direction are fixed to upper surfaces of front and rear ends of the spring fixing portions 8b.

Figure 7:
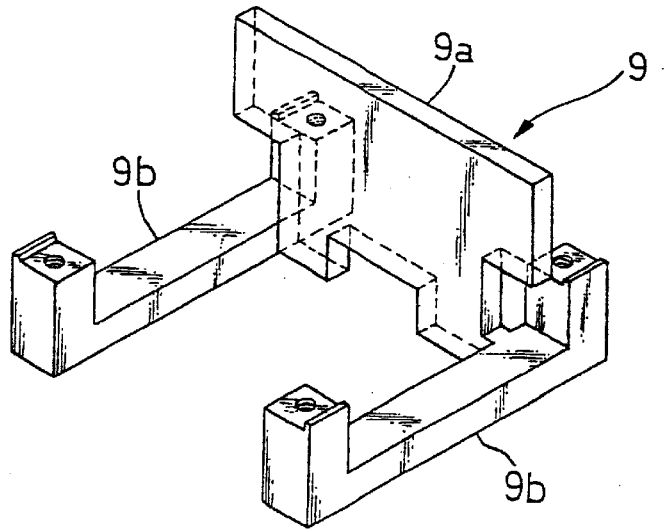
FIG. 7 is a perspective view showing a lower bracket for supporting a damping plate spring.

The lower bracket 9, likewise, includes an attachment portion 9a, and one pair of left and right spring fixing portions 9b (see FIG. 7). The opposite ends of the plate spring 7 extending in a back and forth direction are fixed to upper surfaces of front and rear ends of the sprig fixing portions 9b (see FIG. 2).

On the other hand, the body 10 exhibits a vertically elongated box-like configuration. The body 10 are formed with spring fixing portions 11 projecting from a left and a right side surface of an upper end portion thereof. The one pair of upper plate springs 7 are fixed at centers thereof to the upper surfaces of the spring fixing portions 11, respectively.

Expanded portions 12 expanding leftward and rightward are formed on a lower end portion of the body 10. The spring fixing portions 13 are formed, in their projected fashions, on lower surfaces of the centers of the expanded portions 12 in the back and forth direction, respectively. Each lower plate spring 7 is fixed at the center to each spring fixing portion 12.

Each of the four plate springs 7 has a bent portion 7a between the fixing area at the center and the fixing areas at opposite ends.

A vertically long receiving space 15 is defined within the body 10 such that front and lower sides of the body 10 are open. The body 10 exhibits a generally U-shaped configuration in cross section. The holder 20 is received in the receiving space 15.

The holder 20 has a vertically extending elongated box-like configuration. A receiving space 25 is defined within the holder 20 such that a rear side of the holder 20 is open. The holder 20 exhibits a generally U-shaped configuration in cross section. The holder 20 is coaxial with the body 10. The center co-axis of the body 10 and holder 20 is indicated by L in the illustration.

Figure 4:
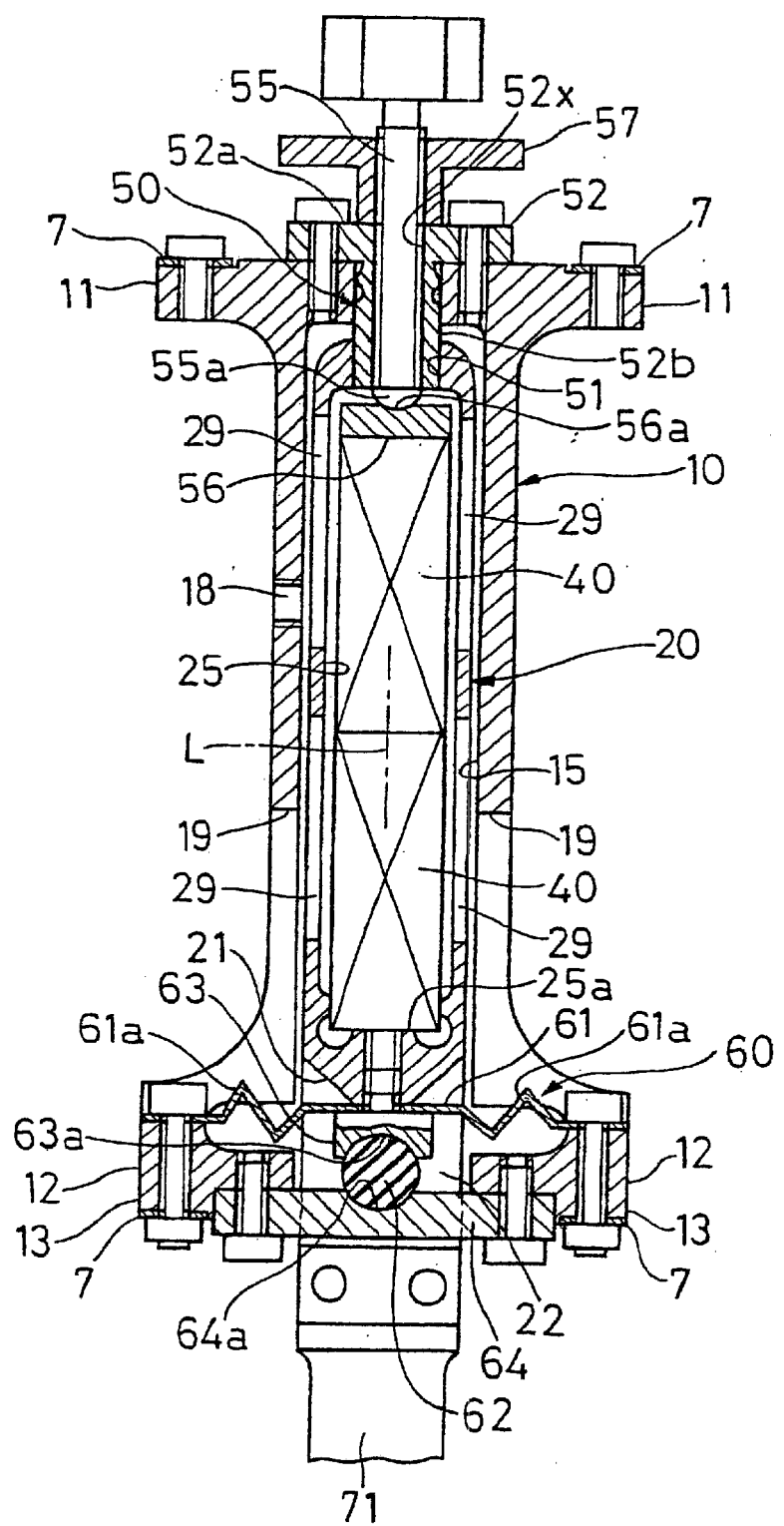
FIG. 4 is a vertical sectional view, taken on line IV—IV of FIG. 2, of the above scribe device.
Figure 5:
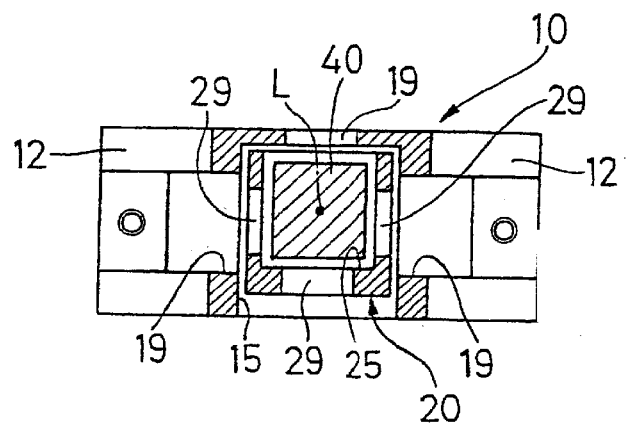
FIG. 5 is a cross sectional view, taken on line V—V of FIG. 1, of the above scribe device.

As best shown in FIGS. 4 and 5, two piezo actuators 40 are received in the receiving space 25 of the holder 20 such that the piezo actuators 40 are coaxial with the body 10 and the holder 20. Each actuator 40 is elongated and exhibits a square configuration in section. The actuators 40 generate vibrations in the axial direction. The two piezo actuators 40 are directly connected together. A lower end face of the lower piezo actuator 40 is in abutment with a bottom surface 25a (abutment portion) of the receiving space 25 of the holder 20.

An attachment hole 18 is formed in a left side wall of the body 10. A nozzle (not shown) is connected to the attachment hole 18. Air from the nozzle enters the receiving space 15 and then flows into receiving space 25. The air flowed into the receiving space 25 is jetted to the piezo actuators 40 to cool them. The body 10 has holes 19 which are formed in left and right walls and a rear wall thereof, whereas the holder 20 has holes 39 which are formed in left and right walls and a front wall thereof. Those holes serve as air passages and air-jetting ports.

The holder 20 is supported on the body 10 by a support mechanism such that the holder 20 can slightly move in a direction (vibrating direction) along the center axis L. The support mechanism comprises a first support portion 50 (slide support portion) disposed above the piezo actuators 40 and a second support portion 60 disposed under the piezo actuators 40.

The first support portion 50, as shown in FIG. 4, comprises a slide hole 51 (slide portion of the holder 20) having a circular configuration in section which is formed all the way through an upper wall of the holder 20 and a guide member 52 mounted on an upper wall of the body 10. The guide member 52 includes an attachment portion 52a having a plate-like configuration and fixed to an upper end face of the body 10 and a cylindrical portion 52b (guide portion of the body 10, projection) projecting downward from the attachment portion 52a. The cylindrical portion 52b extends through the upper wall of the body 10 and is inserted into the slide hole 51 only with a slight clearance. By this, the upper end portion of the holder 20 is slidably supported by the body 10. Since the slide hole 51 and the cylindrical portion 52b of the guide member 52 are coaxial with the body 10, the sliding direction of the holder 20 is coincident with the vibrating direction of the piezo actuators 40.

A screw hole 52x is formed in the guide member 52. An adjustment screw 55 (pre-load adjustment means) for exhibiting an adjusting function as later described, is threadingly engaged with the screw hole 52x. A lower end portion 55a (distal end portion) of the adjustment screw 55 is in abutment with an upper end face of the upper piezo actuator 40 through a receiving plate 56 and offered as an abutment portion of the body 10. The lower end portion 55a of the adjustment screw 55 is in the form of a convex spherical surface and fittingly contacted with a receiving seat 56a consisting of a concave spherical surface of the receiving plate 56.

The lower end portion 55a of the adjustment screw 55 is opposed to the bottom surface 25a of the receiving space 25 of the holder 20 in a vertical direction (direction along the center axis L). The piezo actuators 40 are arranged in such a manner as to be sandwiched between the lower end portion 55a the bottom surface 25a.

The adjustment screw 55 is threadingly engaged with a lock nut 57 for fixing the adjustment screw 55.

A second support portion 60, as shown in FIG. 4, comprises a plate spring 61 as a resilient member and a spherical ball 62 made of resilient material such as rubber, resin or the like.

The plate spring 61 is fixed at its opposite ends to an upper surface of the expanded portion 12 of the body 10 and at its center to a lower end face of the spring fixing portion 21 by a screw 63. The spring fixing portion 21 is formed on the holder 20 and tapered such that it is reduced in thickness towards its tip. The spring fixing portion 21 and the center of the plate spring 61 are arranged on the center axis L of the body 10, the holder 20 and the piezo actuators 40.

The plate spring 61 has a bent portion 61a between the center fixing area and the opposite ends fixing areas.

The ball 62 is interposed between a head portion (ball abutment portion of the holder 20) of the screw 63 and the receiving plate 64 (ball abutment portion of the body 10). The receiving plate 64 is fixedly bridged between lower end faces of the left and right expanded portions 12 of the body 10. The head portion and the receiving plate 64 are formed with receiving seats 63a, 64a, respectively, which are in the form of concave spherical surfaces, respectively. The ball 62 is fitted between the receiving seats 63a, 64a. The screw 63, the center of the receiving plate 64 and the ball 62 are arranged on the center axis L of the piezo actuators 40, etc.

An attachment structure of the cutter 30 will now be described. The holder 20 is bifurcated into one pair of extension portions 22. The one pair of extension portions 22 extend downward from the fixing portion 21. The plate spring 61, the ball 62 and the receiving plate 64 are arranged between the extension portions 22.

A first attachment 71 is connected to lower end portions (distal end portions) of the extension portions 22 of the holder 20. A second attachment 72 is connected to the first attachment portion 71 such that the angle of connection can be adjusted. A lower surface of the second attachment 72 is formed with a receiving hole 72a. The cutter 30 is received in this receiving hole 72a and removably fixed thereto by a screw 73.

The cutter 30 is disposed on the center axis L of the piezo actuators 40. A lower end (distal end) of the cutter 30 has a conical shape and is sharpened. A pyramidal diamond grain is secured to the lower end of the cutter 30. A vertex of the diamond grain faces downward so as to contact a plate glass 100 (workpiece) as later described.

A guide plate 35 is attached to the attachment 72. The guide plate 35 is composed of a U-shaped spring and is fixed to opposite side surfaces of the attachment 72.

As shown in FIGS. 1 and 2, a hole 35a is formed in a central portion of the guide plate 35. The lower end of the cutter 30 projects downward a prescribed amount from the guide plate 35 through the hole 35a.

As shown in FIGS. 1 and 3, an air cylinder 80 (pushup mechanism) is vertically attached to the base plate 3. On the other hand, an L-shaped bracket 85 is fixed to a side surface of the body 10. A vertical short rod 86 is threadingly engaged with the bracket 85. The short rod 86 and an upper end of a rod 81 of the air cylinder 80 are in opposing relation.

Operation of the scribe device thus constructed will now be described. When the adjustment screw 35 is screwed, the piezo actuators 40 and the holder 20 are moved downward. In accordance with this downward movement, a downward force is exerted to the plate spring 61 through the spring fixing portion 21. A downward force is also exerted to the ball 62 through the screw 63. Since the plate spring 61 is fixed at its opposite ends to the expanded portions 12 of the body 10, the plate spring 61 is resiliently deformed by the downward force. Since the ball 62 is retained by the receiving plate 64 fixed to the body 10, it is resiliently compression-deformed. A resilient restoring force of the plate spring 61 and ball 62 serves as a force for biasing the holder 20 upward with respect to the body 10. As a consequence, the bottom surface 25a of the receiving space 25 of the holder 20 is biased towards the piezo actuators 40 and a pre-load (force in a direction for axially compressing the piezo actuators 40) is applied to the piezo actuators 40 sandwiched between the bottom surface 25a and the lower end portion 55a of the adjustment screw 55.

As the screwing amount of the adjustment screw 55 is increased, the pre-load applied to the piezo actuators 40 is increased. After the pre-load adjustment using the adjustment screw 55 is finished, the lock nut 57 is tightened to prevent the adjustment screw 55 from getting loosened.

A scribe line is formed on the plate glass 100 (workpiece) set on a horizontal installation table 90 using the scribe device which has been subjected to pre-load adjustment treatment. At an initial stage, the cutter 30 of the scribe device is horizontally away from the edge of the plate glass 100 and located in the lowermost position (position corresponding to the lowermost position of the slider 6). In that state, when the moving mechanism 2 is driven to cause the moving base 1 to move in a horizontal direction, the body 10, the holder 20 and the cutter 30 move in the same direction altogether. Then, the guide plate 35 attached to the holder 20 is brought into abutment with the edge of the plate glass 100 and the cutter 30 is guided onto an upper surface of the plate glass 100 by the guide plate 35.

As mentioned above, a pressing force is normally exerted to the cutter 30 with respect to the upper surface of the plate glass 100, with the cutter 30 placed on the upper surface of the plate glass 100. This pressing force is attributable from their own weights of the body 10, the holder 20, the slider 6, etc. The pressing force can be adjusted by removably attaching a weight 95 to the body 20.

A scribing operation is practiced with the cutter 30 pressed against the surface of the plate glass 100 by their own weights of the body 10, etc., as described above. Specifically, the moving base 1 is moved by the moving mechanism 2 to cause the cutter 20 to move along the plate glass 100. And a high frequency voltage is supplied to the piezo actuators 40 to cause the piezo actuators 40 to be cyclically expanded and contracted in the axial direction. Then, vibration of the holder 20 caused by the cyclic expansion and contraction of the piezo actuators 40 is transmitted to the plate glass 100 through the cutter 30. As a consequence, a scribe line having a deep vertical crack can be formed. However, since the pressing force attributable to their own weights of the body 10, etc. is comparatively small, a horizontal crack, which would otherwise occur as in the conventional devices, hardly occurs.

In this embodiment, two piezo actuators 40 are linearly connected together and a synchronized high frequency voltage is supplied thereto so that vibrations having a double amplitude can be generated, compared with the case in which only one piezo actuator 40 is employed. Owing to this feature, a scribe line having a sufficient depth can be formed in the case wherein the plate glass 100 has a large thickness.

The frequency of the high frequency voltage supplied to the piezo actuators 40 is set to about 3 to 30 KHz depending on material, hardness, thickness, etc. of the plate glass 100.

In the process for forming a scribe line, the cutter 30 is normally contacted with the surface of the plate glass 100 by the pressing force attributable to their own weights of the body 10, etc. Since the cutter 30 is never moved away, even in an instant, from the surface of the plate glass 100, chips can be prevented from occurring in the nearby area of the scribe line and a beautiful scribe line can be formed. Since the holder 20 is a rigid body and the cutter 30 is attached to the holder 20 without a provision of any resilient body as an intermediate member, the cutter 30 is vibrated in unison with the holder 20 and the vibration energy of the piezo actuators 40 can be transmitted to the cutter 30 in a desirable condition.

Since, in this embodiment, the piezo actuators 40 and the holder 20 are coaxial and the cutter 30 is located on the center axis L thereof, the vibration of the piezo actuators 40 can be transmitted to the cutter 30 efficiently.

As described above, since the piezo actuators 40 are incurred with a pre-load by the resilient restoring force of the plate spring 61 and the ball 62, the vibration of the abutment member can be caused in accordance with expansion and contraction of the piezo actuators 40 in a favorable manner without being affected by reaction of the workpiece and a scribing operation can be carried out under a stable vibration.

The holder 20 is slidably supported on the body 10 by the first support portion 50 disposed above the piezo actuators 40. The distance of the slide support is short, and the cylindrical portion 52b and the slide hole 51 are simplified in structure. By resiliently supporting the holder 20 by the plate spring 61 and the ball 62 of the second support portion 60 arranged under the piezo actuators 40 such that the holder 20 can slightly move in the vibrating direction (sliding direction), the holder 20 can be supported in a stable manner.

Since the second support portion 60 is disposed between the piezo actuators 40 and the cutter 30, even if the holder 20 should be swung laterally, the lateral swinging of the cutter 30 could be minimized.

The slide support is so simple in structure that it comprises only the slide hole 51 and the cylindrical portion 52b without a need of a slide mechanism comprising a rolling bearing which is essentially employed in the conventional devices. According, even if the holder 20 should reciprocally move a distance of several microns several hundreds thousand times in one minute, a good durability could be ensured.

The plate spring 61 and the ball 62, as mentioned above, have both the roles for applying a pre-load to the piezo actuators 40 and for resiliently supporting the holder 20.

The ball 62 has an additional role for avoiding resonance and preventing the cutter 30 from being spring up from the plate glass 100. The plate spring 61 has an additional role for supporting the rotation of the holder 20.

Although the plate spring 61 is fixed at the opposite ends, it includes the bent portion 61a between the fixed place at the center and the fixed places at the opposite ends. Accordingly, the vertical positional adjustment of the holder 20 by means of the adjustment screw 55 and vibration of the holder 20 are facilitated.

Since, in this embodiment, the plate spring 7 is interposed between the body 10 and the slider 6, the vibration transmitted to the body 10 from the vibration actuators 40 is damped. Accordingly, the possible occurrence of a resonance can be further lessened, the abutment member 30 can be prevented from being sprung up from the workpiece 10 and a stable scribing operation can be performed.

Since the slider 6 is movable by the vibration transmitted from the body 10 through the plate spring 7, a large amount of reaction force is not applied to the body 10. Accordingly, the possible occurrence of a resonance can be minimized.

Moreover, since the plate spring 7 includes the bent portion 7a, a relative moving amount of the body 10 with respect to the slider 6 can be increased and therefore, damping of vibration can be performed more favorably.

Since the four plate springs 7 are arranged on the left and right sides in the forms of "pair" and at least two pairs of plate springs 7 are vertically spacedly arranged, the body 10 is stably supported by the slider 6 and the slight movement (vibration) of the body 10 is made along the vibration axis (center axis L of the body 10) of the actuators 40 at the time of scribing. This also enhances a stable scribing operation.

Furthermore, the centers of the four plate springs 7 and the center axis L of the body 10 are arranged on a same plane. This further facilitates a stable support of the body 10.

When the operation for forming the scribe line on the plate glass 100 using the cutter 30 is finished, the supply of power to the piezo actuators 40 is stopped and the air cylinder 80 is actuated to push up the body 10 to move the cutter 30 away from the workpiece 100. Then, the plate glass 100 is removed from the installation table 90. Thereafter, the moving base 1 is return to its original position and the air cylinder 80 is actuated in the opposite direction so that the state of FIG. 1 is realized, in other words, the air cylinder 80 is brought back to the state in which the upper end of the rod of the air cylinder 80 is located away from the short rod 86. By doing so, the body 10 is returned to its lowermost position.

The plate glass 100 with the scribe line formed thereon in the above-mentioned manner is broken along the scribe line by a breaking apparatus, not shown.

It should be noted that the present invention is not limited to the above embodiment and many changes and modifications can be made. For example, it is accepted that an air cylinder is indirectly fixed to the support table 1 and a distal end of its rod is connected to or abutted with the slider 6. By this air cylinder, the slider 6 or the body 10 is biased towards the surface of a workpiece. It is also accepted that the body 10 and the holder 20 of FIG. 1 are arranged horizontally and a scribing operation is performed with respect to a vertical surface of a workpiece.

It is also accepted that instead of horizontally moving the support table 1 which supports the body 10, it is fixedly secured to a prescribed position and the moving mechanism 2 is connected to the installation table 90 so that the plate glass 100 placed on the installation table 90 is moved.

Although, in the above-mentioned embodiment, a cutter having a conical or pyramidal configuration is employed, a disc-like cutter may be employed. In the case where a disc-like cutter is employed, a part of a peripheral edge of the cutter is provided as a sharpened tip which is brought into abutment with a workpiece.

The movement of the body with respect to the workpiece or the movement of the workpiece with respect to the body may be manually performed by the operator. Also, the pressing force may be manually applied to the cutter by the operator through the body.

Of the plate spring 61 and the ball 62 of the second support portion 60, either the plate spring 61 or the ball 62 may be omitted.

The first support portion 50 (slide support portion) may be omitted. In the case where the first support portion 50 is omitted, it is required that the flattened upper end face of the piezo actuator 40 and the surface of the abutment portion of the body 10 are butted with each other such that former and the latter are precisely held in orthogonal relation to the center axis of the piezo actuator.

What is claimed is:

1. A scribe device comprising:

a body (10) having an abutment portion (55a);

a holder (20) having another abutment portion (25a);

a vibration actuator (40) supported between said abutment portion of said body and said abutment portion of said holder and generating vibrations in opposing directions thereof;

an abutment member (30) retained by one end portion of said holder for transmitting the vibrations, which have been given to said holder from said vibration actuator, to a workpiece (100); and a resilient member (61, 62) for movably supporting said holder on said body for movement in the vibration directions, said resilient member being disposed between said vibration actuator (40) and said abutment member (30) and resiliently deformably only in the vibration directions, and said resilient member biasing said holder (20) against said vibration actuator (40), thereby applying a pre-load to said vibration actuator;

wherein an adjustment screw (55) is threadingly engaged with said body (10), a distal end portion of said adjustment screw (55) being provided as said abutment portion of said body, the pre-load applied to said vibration actuator (40) being adjusted by adjusting a screwing amount of said adjustment screw.

2. A scribe device comprising:

a body (10) having an abutment portion (55a);

a holder (20) having another abutment portion (25a);

a vibration actuator (40) supported between said abutment portion of said body and said abutment portion of said holder and generating vibrations in opposing directions thereof;

an abutment member (30) retained by one end portion of said holder for transmitting the vibrations, which have been given to said holder from said vibration actuator, to a workpiece (100); and a resilient member (61, 62) for movably supporting said holder on said body for movement in the vibration directions, said resilient member being disposed between said vibration actuator (40) and said abutment member (30) and resiliently deformable only in the vibration directions, and said resilient member biasing said holder (20) against said vibration actuator (40), thereby applying a pre-load to said vibration actuator;

wherein said resilient member includes a plate spring (61), said plate spring being fixed, at opposite ends thereof, to said body (10) and, at a center thereof, to said holder (20) respectively, a bent portion (61a) being formed between the center and each of the opposite ends of said plate spring (61).

3. A scribe device comprising:

a body (10) having an abutment portion (55a);

a holder (20) having another abutment portion (25a);

a vibration actuator (40) supported between said abutment portion of said body and said abutment portion of said holder and generating vibrations in opposing directions thereof;

an abutment member (30) retained by one end portion of said holder for transmitting the vibrations, which have been given to said holder from said vibration actuator, to a workpiece (100); and a resilient member (61, 62) for movably supporting said holder on said body for movement in the vibration directions, said resilient member being disposed between said vibration actuator (40) and said abutment member (30) and resiliently deformable only in the vibrations directions, and said resilient member biasing said holder (20) against said vibration actuator (40), thereby applying a pre-load to said vibration actuator;

wherein said resilient member includes a ball (62) made of resilient material, said ball being pinchingly held by a pair of spherical receiving seats (63a, 64a) disposed on said body (10) and said holder (20).

4. A scribe device comprising:

a body (10) having an abutment portion (55*a*);

a holder (20) having another abutment portion (25*a*);

a vibration actuator (40) supported between said abutment portion of said body said abutment portion of said holder and generating vibrations in opposing directions thereof;

an abutment member (30) retained by one end portion of said holder for transmitting the vibrations, which have been given to said holder from said vibration actuator, to a workpiece (100); and a resilient member (61, 62) for movably supporting said holder on said body for movement in the vibration directions, said resilient member being disposed between said vibration actuator (40) and said abutment member (30) and resiliently deformably only in the vibration directions, and said resilient member biasing said holder (20) against said vibration actuator (40), thereby applying a pre-load to said vibration actuator;

wherein there is further provided a slide support portion (50) for slidably supporting said holder in the vibrating directions, said slide support portion being in opposing relation to said resilient member (61, 62) in the vibrating directions and arranged, when viewed from said vibration actuator (40), on the opposite side of said abutment member (30); and wherein said slide support portion (50) comprises a slide hole (51) formed in the holder (20) and having an axis extending along the vibrating directions, and a projection (52*b*) formed on said body (10) in such a manner as to project in the vibrating directions and fitted into said slide hole.

\* \* \* \* \*

UNITED STATES PATENT AND TRADEMARK OFFICE
CERTIFICATE OF CORRECTION

PATENT NO.    : 6,442,852 B1
DATED         : September 3, 2002
INVENTOR(S)   : Gyo Shimotoyodome It is certified that error appears in the above-identified patent and that said Letters Patent is hereby corrected as shown below:

Column 10,
Line 5, between "said body" and "Said document" insert -- and --.

Column 11,
Line 16, replace "deformably" with -- deformable --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,442,852 B1
DATED : September 3, 2002
INVENTOR(S) : Gyo Shimotoyodome It is certified that error appears in the above-identified patent and that said Letters Patent is hereby corrected as shown below:

Column 10,
Line 5, between "said body" and "said abutment portion" insert -- and --.

Column 11,
Line 16, replace "deformably" with -- deformable --.

This certificate supersedes Certificate of Correction issued March 18, 2003.

Signed and Sealed this

Twenty-seventh Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,442,852 B1
DATED           : September 3, 2002
INVENTOR(S)     : Gyo Shimotoyodome It is certified that error appears in the above-identified patent and that said Letters Patent is hereby corrected as shown below:

<u>Column 11,</u>
Line 5, between "said body" and "said abutment portion" insert -- and --.
Line 16, replace "deformably" with -- deformable --.

This certificate supersedes Certificate of Correction issued May 27, 2003.

Signed and Sealed this

Nineteenth Day of August, 2003

JAMES E. ROGAN
*Director of the United States Patent and Trademark Office*